US008379920B2

(12) United States Patent
Yang et al.

(10) Patent No.: US 8,379,920 B2
(45) Date of Patent: Feb. 19, 2013

(54) REAL-TIME CLOTHING RECOGNITION IN SURVEILLANCE VIDEOS

(75) Inventors: Ming Yang, Cupertino, CA (US); Kai Yu, Santa Clara, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 151 days.

(21) Appl. No.: 12/985,003

(22) Filed: Jan. 5, 2011

(65) Prior Publication Data

US 2011/0274314 A1 Nov. 10, 2011

Related U.S. Application Data

(60) Provisional application No. 61/331,422, filed on May 5, 2010.

(51) Int. Cl.
*G06K 9/00* (2006.01)
*G06K 9/34* (2006.01)
*G06K 9/46* (2006.01)
(52) U.S. Cl. ........ 382/103; 382/115; 382/164; 382/171; 382/173; 382/190
(58) Field of Classification Search .................. 382/103, 382/111, 195, 209, 224, 173; 348/77; 706/12, 706/20
See application file for complete search history.

(56) References Cited

U.S. PATENT DOCUMENTS

| 6,188,777 | B1* | 2/2001 | Darrell et al. | 382/103 |
| 2006/0120609 | A1* | 6/2006 | Ivanov et al. | 382/224 |
| 2006/0253491 | A1* | 11/2006 | Gokturk et al. | 707/104.1 |
| 2007/0127813 | A1* | 6/2007 | Shah | 382/170 |
| 2007/0237364 | A1* | 10/2007 | Song et al. | 382/115 |
| 2008/0002892 | A1* | 1/2008 | Jelonek et al. | 382/224 |
| 2008/0025577 | A1* | 1/2008 | Kugo et al. | 382/118 |
| 2008/0082426 | A1* | 4/2008 | Gokturk et al. | 705/27 |
| 2009/0116698 | A1* | 5/2009 | Zhang et al. | 382/111 |
| 2010/0046797 | A1* | 2/2010 | Strat et al. | 382/103 |

OTHER PUBLICATIONS

Aamer Mohamed, Ying Weng, Jianmin Jiang, Stan Ipson, Face Detection Based Neural Networks Using Robust Skin Color Segmentation, (Jul. 20, 2008), in 2008 IEEE 5th International Multi-Conference on Systems, Signals, and Devices, pp. 1-5.*

Ayesha Farrukh, Arif Ahmad, M. Ijaz Khan, Nadeem Khan, Automated Segmentation of Skin-Tone Regions in Video Sequences, (Aug. 16, 2002), in ISCON '02 Proceedings of the 2002 IEEE Students Conference, vol. 1, pp. 122-128.*

Navneet Dalal, Bill Triggs, Histograms of Oriented Gradients for Human Detection, (Jun. 25, 2005), in CVPR '05 Proceedings of the 2005 IEEE Computer Society Conference on Computer Vision and Pattern Recognition, vol. 1, pp. 886-893.*

Wei Zhang, Bo Begole, Maurice Chu, Juan Liu, Nick Yee, Real-Time Clothes Comparison Based on Multi-View Vision, (Sep. 7, 2008), in Proceedings of the 2nd ACM/IEEE International Conference on Distributed Smart Cameras (ICDSC), pp. 1-10.*

Brian Tomasik, Phyo Thiha, Douglas Turnball, Tagging Products using Image Classification, Jul. 2009, Swarthmore College, Technical report.*

David Sinclair, Voronoi seeded colour image segmentation, 1999, AT&T Laboratories Cambridge, Technical Report 3.*

Andrew C. Gallagher, et al., Clothing Cosegmentation for Recognizing People, IEEE 2008.

(Continued)

*Primary Examiner* — Claire X Wang
*Assistant Examiner* — Carol Wang
(74) *Attorney, Agent, or Firm* — Joseph Kolodka; Bao Tran

(57) ABSTRACT

Systems and methods are disclosed to recognize clothing from videos by detecting and tracking a human; performing face alignment and occlusal detection; and performing age and gender estimation, skin area extraction, and clothing segmentation to a linear support vector machine (SVM) to recognize clothing worn by the human.

20 Claims, 3 Drawing Sheets

OTHER PUBLICATIONS

Zhilan Hu, et al., Clothing segmentation using foreground and background estimation based on the constrained Delaunay triangulation, Pattern Recognition 2007.

Chin-Chou Chang, et al., Color texture segmentation for clothing in a computer-aided fashion design system, Image and Vision Computing 1996.

Hong Chen, et al., Composite Templates for Cloth Modeling and Sketching, Departments of Statistics and Computer Science, CVPR 2006.

David Lowe, et al., Distinctive Image Features from Scale-Invariant Keypoints, International Journal of Computer Vision 2004.

Andrew C. Gallagher, et al., Clothing Cosegmentation for Recognizing People, CVPR 2008.

* cited by examiner

REAL-TIME CLOTHING RECOGNITION IN SURVEILLANCE VIDEOS

The present application claims priority to Provisional Application 61/331,422 filed May 5, 2010, the content of which is incorporated by reference.

BACKGROUND

The present invention relates to clothing recognition from video.

Clothing recognition is an advanced and emerging multimedia application, which may benefit customer profile analysis, context-aided people identification, and computer aided fashion design. Although this problem attracts increasing research interests in recent years, a real-time clothing recognition system, especially for surveillance videos, remains challenging, primarily due to two reasons. First, such a system involves a series of difficult sub-problems including face detection and tracking, human figure or clothing segmentation, and effective clothing representations. Second, the differences among various clothing categories are inherently subtle and sometimes even vague for human, thus considerable computations may be required to discern them.

In digital analysis of clothing images, conventional systems typically segmented clothes as foreground objects assuming certain foreground seeds or regions of interests provided by users, or the same clothes appearing in different backgrounds. In other works, rough clothing analysis was employed as contexts to help people identification. High-level modeling of clothes based on And-Or graphs also have been tried. Responsive and smart mirrors have been used to retrieve similar clothing styles for fashion recommendation in a fitting room.

SUMMARY

Systems and methods are disclosed to recognize clothing from videos by detecting and tracking a human; performing face alignment and occlusal detection; and performing age and gender estimation, skin area extraction, and clothing segmentation to a linear support vector machine (SVM) to recognize clothing worn by the human.

Advantages of the preferred embodiments may include one or more of the following. The system works well with surveillance videos, where people are not as cooperative as in a fitting room. The system can handle scale changes and partial occlusions. The system can also assign clothing categories as tags without any query image. As existing approaches concentrate on processing static images of a single person, hence, the computational costs tend to be too high for video analysis. In contrast, the system is low in complexity and thus the computations are affordable for video analysis and processes multiple persons simultaneously in real-time. Recognition of clothing categories from videos is appealing to diverse emerging applications such as intelligent customer profile analysis and computer-aided fashion design.

DESCRIPTION

Figure 1:
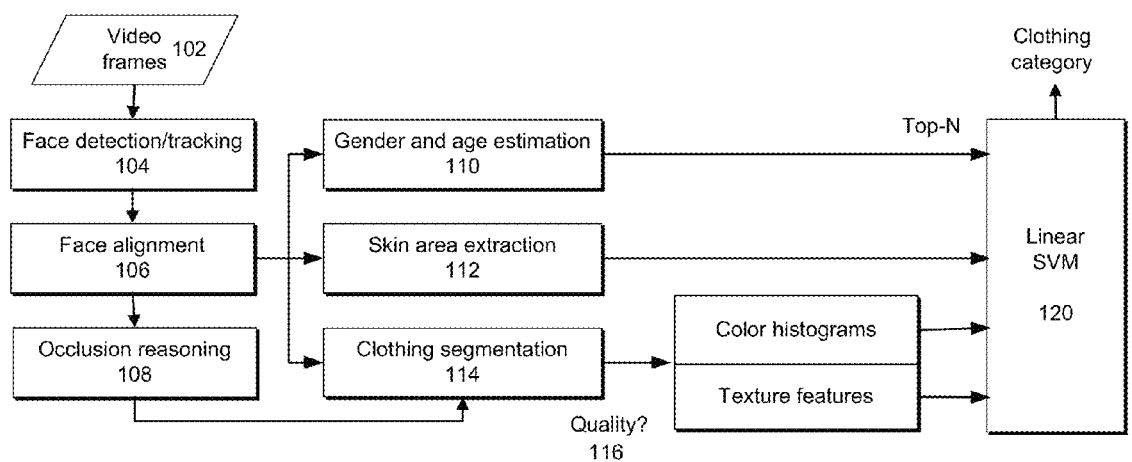
FIG. 1 shows an exemplary clothing video content analysis system.
Figures 2A, 2B:
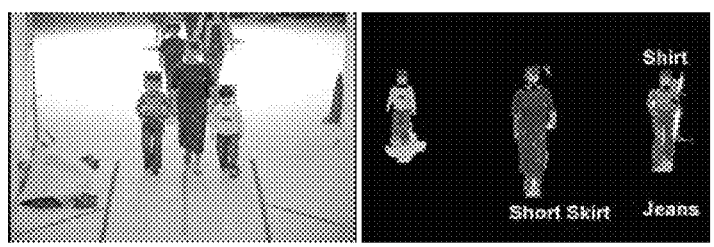
FIGS. 2A-2B show exemplary clothing video content categorizations by the system of FIG. 1.

FIG. 1 shows an exemplary video content analysis system that can tag clothes of multiple persons to certain pre-defined categories, i.e., suit, shirt, T-shirt, jeans, short pant, short skirt and long skirt. The result of such categorization is illustrated in FIGS. 2A and 2B.

As shown in FIG. 1, video frames are captured (102). Human detection and tracking is done (104), and face alignment is applied (106). Next, occlusal detection is performed (108). Information from the face alignment is provided to perform age and gender estimation (110), skin area extraction (112) and clothing segmentation (114).

The output of the clothing segmentation is provided to a module 116 that checks for the quality of the shape/texture and color histograms. The age/gender estimation, skin area, and clothing segmentation, along with quality information, are provided to a linear support vector machine (SVM) 120.

In one embodiment, the system performs face detection and tracking for each frame and aligns the detected faces. Then, the system crops a candidate rectangular region based on each aligned face (5 times of the face width and 9 times of the face height). Simple occlusion determination among persons is conducted according to face locations and overlapped areas of the candidate rectangles. For persons with a visible frontal face and moderate occlusions, i.e. the visible area is larger than of the cropped rectangle, the system segments the clothing from this candidate region using an efficient variant of region growing method. A cloth is represented by the average feature vector of instances, including his/her estimated gender and age, skin area ratios of arms and legs, 2D color histograms in the LAB space, and texture descriptors. Afterwards, multiple one-against-all linear SVM classifiers are employed to learn the clothing categories. To make the system general for different scenarios, no user interaction is required in the process at any time.

The system can tag clothing categories in real time, which addresses some practical complications in surveillance videos. The system takes advantage of face detection and tracking to locate human figures, along with an efficient clothing segmentation method employing Voronoi images, to select seeds for region growing. The system also compares clothing representations combining color histograms and a plurality of different texture descriptors (such as three descriptors).

Video content analysis systems confront by many complications in surveillance videos. For example, when the surveillance camera is mounted at the entrance of a shopping mall, the interaction of multiple persons may lead to partial occlusions and cluttered background, not to mention the scale and view angle changes. These difficulties are addressed by integrating diverse features from multiple cloth instances.

Clothing recognition involves sub-tasks such as localization of human figures, clothing segmentation and alignment, and extraction of clothing representations. None of them is a fully solved problem for surveillance videos. Hence, the system robustly performs the identification even in the absence of reliable results from every single frame.

In one embodiment, the system collects cloth instances on the trajectory of a person and preserves the top good instances which are measured by visible areas and the quality of segmentation results. The average features of these instances are used to represent the clothes. Since clothing categories are high-level semantic concepts, one embodiment integrates various relevant clues to recognize them, such as a person's gender and age, uncovered skin areas, color and texture features of clothes. In one implementation, color and texture features are extracted from the right clothes, not from the background or nearby persons.

Clothing segmentation and proper human figure alignment are the prerequisites to perform feature extraction and clothing classification, thus are important to the recognition accuracy. A lightweight variant of the region growing based color segmentation method is used for foreground clothing segmentation. Although the cameras are stationary in current test videos, in order to ensure the applicability of the system for moving cameras, no motion information is used, and background subtraction technique is not used.

Figure 3:
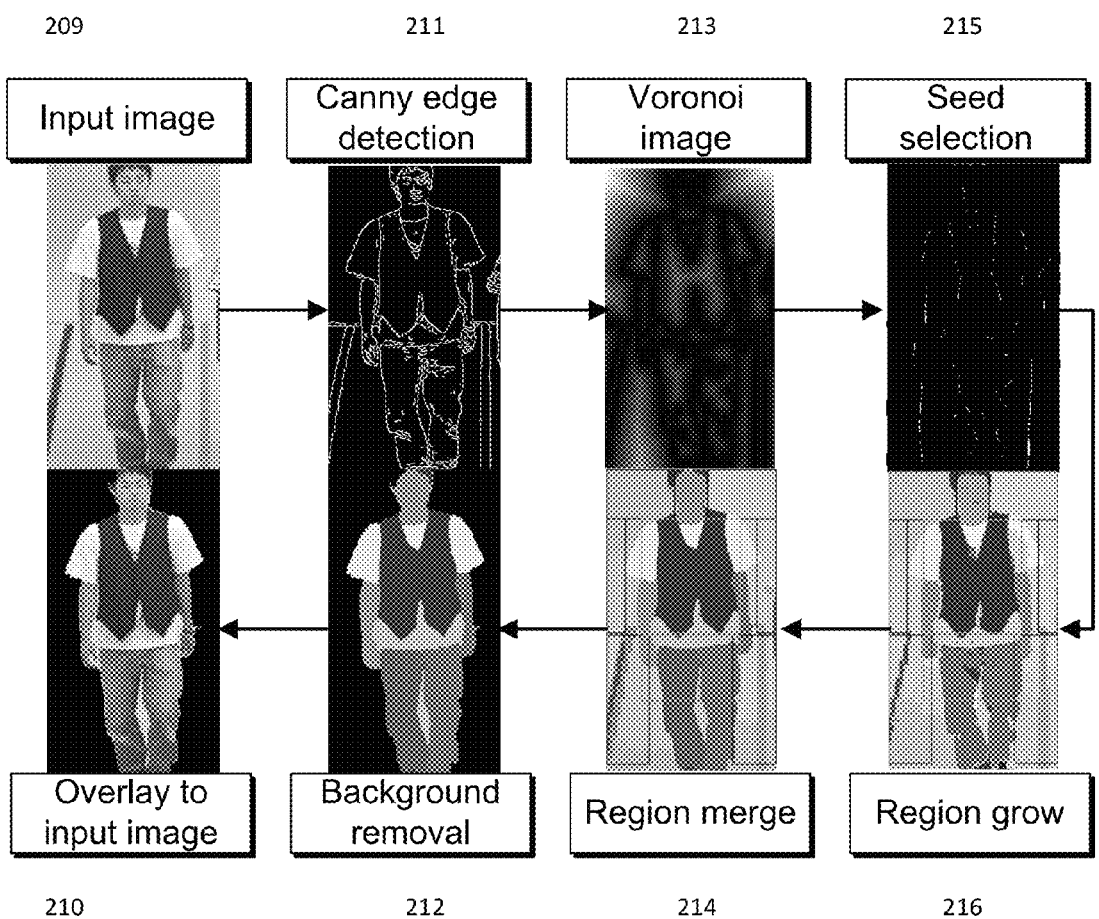
FIG. 3 shows an exemplary flow chart for clothing segmentation.

FIG. 3 shows an exemplary flow chart of clothing segmentation. Given the candidate rectangle region of a person, the system segments the image to roughly homogeneous color segments, then applies prior knowledge of foreground and background based on the face alignment to extract the foreground figure or clothes. From an input image 209, canny edge detection 211 is done. Then a Voronoi image 213 is generated, and seed selection 215 is done. The region is grown in 216, and merged in 214, and background is removed in 212 before the output is overlay with the input image in 210. In one embodiment, the Voronoi image is used to automatically place the seed points close to the centers of homogeneous regions. The intensity at each point on a Voronoi image is the distance to the closest edge, hence, the peaks reflect the farthest points from the contours. Therefore, the system performs Canny edge detection on gray-level images and chooses the local maximums on the Vonoroi image as seeds for region growing. By discarding small local maximums, small segments are merged, so the system mitigates the over-segmentation problem for texture regions to some extent. Next, the system employs L2 norm of two color pixels in the perceptual uniform LAB color space to measure their discrepancy and obtain rough homogeneous color segments after region growing. The color pixels in one segment are modeled as a Gaussian distribution, then two adjacent segments are merged if the Mahalanobis distance of two color distributions is small. Small color segments are merged to the most similar segments next to them. Finally, the system applies the prior knowledge of foreground and background to extract the foreground clothing and measure the segmentation quality. Further the foreground mask is used to extract the color and texture features of clothing.

The advantage of this method is the computational efficiency which is critical for real-time applications. In one embodiment, the region growing method takes about 15-18 ms to process candidate images with resolution. A normalized-cut based color segmentation embodiment takes nearly a second to process images with similar sizes. Yet the region growing method may suffer from the so-called leakage problem occasionally.

Since the clothing segmentation results may not be reliable for every single frame due to partial occlusion or the occasional leakage problem, the system employs a few cloth instances with good segmentation quality to calculate the average feature vector to represent a person's cloth. The quality of clothing segmentation is measured by the difference between the ratios of overlapped areas of foreground clothes with the foreground priors and background priors in FIG. 3. We keep a set of cloth instances for a person up to the current frame. The features include the estimation of gender and age, the skin area ratios of limbs, color histograms, and texture features.

The skin areas of arms and legs uncovered by clothes are an informative clue for clothing category. Though the skin tone may appear distinct under different lighting conditions, the color on the face is usually consistent with color of arms and legs. In one implementation, the system computes a 2D color histogram from the aligned frontal face in the LAB color space. The dominant color component is regarded as the skin color tone to label the skin pixels on arms and legs. The ratios of skin pixels over the areas of limbs generate a 4D feature vector.

Figures 4A, 4B, 4C:
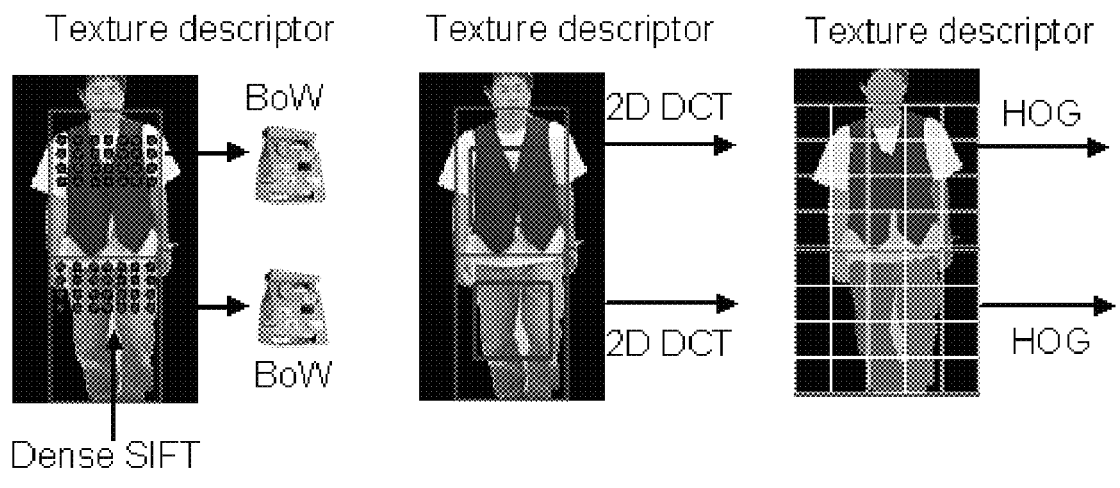
FIGS. 4A-4C show different texture features based on HOG, BoW, and DCT responses.

FIGS. 4A-4C show different texture features based on HOG, BoW, and DCT responses. The system analyzes the clothing categories of the top and bottom parts separately. The clothing segmentation result is used as a mask when calculating the color and texture features. The color of the clothes is delineated by a 2D color histogram in the LAB color space with 32 bins for each channel, that is a 1024D feature vector. The system evaluates various texture features based on histogram of oriented gradient (HOG) in multiple spatial cells, a bag of dense SIFT features, and DCT responses. The gradient orientations on 8 directions (every 45 degree) are computed on the color segmentation results, not the original raw images. The top and bottom parts are both spatially divided to cells, drawn as rectangles in FIG. 4C, in which the histograms of all cells are concatenated as a HOG feature. The dense 128-dimension SIFT features are calculated every 6 pixels inside the top and bottom parts of a human body which are drawn as rectangles in FIG. 4A. These local features are quantized with a visual codebook with 256 words. The frequencies of the codewords are normalized to generate the BoW descriptor. As illustrated in FIG. 4B, the regions in the two rectangle cells are resized to patches, then the first 128 components of the DCT coefficients in the zigzag scan are packed together to form a DCT feature.

The gender and age, the ratios of skin areas, color histograms, and texture features are concatenated as the clothing representation. A one-against-all linear SVM classifier is learnt for each clothing category. From evaluations, the HOG feature outperforms the other two, which implies the shapes of color segments reveal more about clothing categories rather than the textures of original raw images.

The system is a practical clothing recognition system for surveillance videos. The system uses an efficient color segmentation method and benefits from various texture features tailored for real-time recognition of clothing categories. The system accurately tags various clothing categories. The use of local shape descriptors of color segments is also contemplated.

Figure 5:
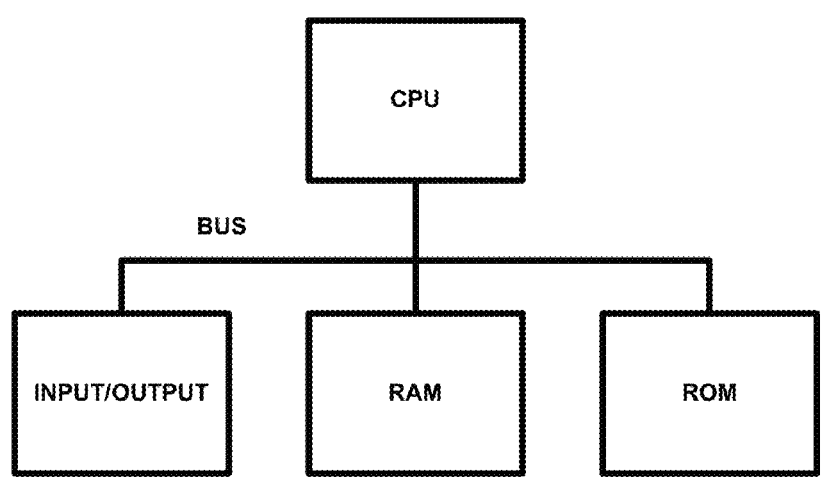
FIG. 5 shows an exemplary system to perform clothing detection.

FIG. 5 shows an exemplary system to perform clothing detection. The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a computer with digital signal processing capability to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to recognize clothing from videos, comprising detecting and tracking a human,
   evaluating texture features based on histogram of oriented gradient (HOG) in multiple spatial cells, a bag of dense SIFT features, and DCT responses, wherein the gradient orientations on 8 directions (every 45 degree) are computed on color segmentation results;
   performing face alignment and occlusal detection; and
   performing age and gender estimation, skin area extraction, and clothing segmentation to a linear support vector machine (SVM) to recognize clothing worn by the human.

2. The method of claim 1, comprising checking for quality of shape/texture and color histograms.

3. The method of claim 1, comprising evaluating different clothing representations combining color histograms with a histogram of oriented gradient (HOG), Bag-of-Words (BOW) features, and discrete cosine transform (DCT) features.

4. The method of claim 1, comprising combining gender and age, skin area ratios of limbs, color, shape and texture features using the clothing segmentation results as a mask.

5. The method of claim 1, comprising using a Voronoi image to conduct seed selection in a region growing segmentation method.

6. The method of claim 1, comprising determining gradient orientations at every 45 degrees on a color segmentation.

7. The method of claim 1, comprising spatially dividing top and bottom parts of a human image into cells, and concatenating histograms of all cells as a HOG feature.

8. The method of claim 1, comprising quantizing local features with a visual codebook and normalizing frequencies of the codewords to generate a BoW descriptor.

9. The method of claim 1, comprising packing components of DCT coefficients to form a DCT feature.

10. The method of claim 1, comprising determining local shape descriptors of color segments on the human.

11. A system to recognize clothing from videos, comprising
    means for detecting and tracking a human,
    means for valuating texture features based on histogram of oriented gradient (HOG) in multiple spatial cells, a bag of dense SIFT features, and DCT responses, wherein the gradient orientations on 8 directions (every 45 degree) are computed on color segmentation results;
    means for performing face alignment and occlusal detection; and
    means for performing age and gender estimation, skin area extraction, and clothing segmentation to a linear support vector machine (SVM) to recognize clothing worn by the human.

12. The system of claim 11, comprising means for checking for quality of shape/texture and color histograms.

13. The system of claim 11, comprising means for evaluating different clothing representations combining color histograms with a histogram of oriented gradient (HOG), Bag-of-Words (BOW) features, and discrete cosine transform (DCT) features.

14. The system of claim 11, comprising means for combining gender and age, skin area ratios of limbs, color, shape and texture features using the clothing segmentation results as a mask.

15. The system of claim 11, comprising a Voronoi image to conduct seed selection in a region growing segmentation method.

16. The system of claim 11, comprising means for determining gradient orientations at every 45 degrees on a color segmentation.

17. The system of claim 11, comprising means for spatially dividing top and bottom parts of a human image into cells, and concatenating histograms of all cells as a HOG feature.

18. The system of claim 11, comprising means for quantizing local features with a visual codebook and normalizing frequencies of the codewords to generate a BoW descriptor.

19. The system of claim 11, comprising means for packing components of DCT coefficients to form a DCT feature.

20. The system of claim 11, comprising means for determining local shape descriptors of color segments on the human.

* * * * *